United States Patent [19]

Richards

[11] Patent Number: 5,724,267
[45] Date of Patent: Mar. 3, 1998

[54] WEIGHT MEASURING APPARATUS USING A PLURALITY OF SENSORS

[76] Inventor: James L. Richards, 58 Boning Rd., Fayetteville, Tenn. 37334

[21] Appl. No.: 674,343

[22] Filed: Jul. 2, 1996

[51] Int. Cl.$^6$ ................................................ G01G 7/00
[52] U.S. Cl. .................... 364/567; 364/571.01; 177/164; 177/25.13
[58] Field of Search ............................... 364/550, 570, 364/571.01, 567; 177/164, 25.11, 25.12, 25.13, 25.14, 50, 1, 145, 185; 119/842; 73/1 B

[56] References Cited

U.S. PATENT DOCUMENTS

| | | | |
|---|---|---|---|
| Re. 32,987 | 7/1989 | Naito et al. | 177/50 |
| 4,380,175 | 4/1983 | Griffen | 73/862.67 |
| 4,416,342 | 11/1983 | Snead | 177/163 |
| 4,535,854 | 8/1985 | Gard et al. | 177/25.13 |
| 4,574,899 | 3/1986 | Griffin | 177/211 |
| 4,657,097 | 4/1987 | Griffen | 177/211 |
| 4,691,794 | 9/1987 | Larsen et al. | 177/211 |
| 4,738,324 | 4/1988 | Borchard | 177/25 |
| 4,739,848 | 4/1988 | Tulloch | 177/211 |
| 4,796,212 | 1/1989 | Kitagawa | 364/571.03 |
| 4,799,558 | 1/1989 | Griffen | 177/25.14 |
| 4,804,052 | 2/1989 | Griffen | 177/25.14 |
| 4,850,442 | 7/1989 | Naito et al. | 177/164 |
| 5,004,058 | 4/1991 | Langford et al. | 177/25.13 |

OTHER PUBLICATIONS

"Strain Gage Based Transducers," Technical Staff of Measurements Group, Inc., 1988, pp. 53–66.

*Primary Examiner*—Emanuel T. Voeltz
*Assistant Examiner*—Craig Steven Miller

[57] ABSTRACT

A weight measuring apparatus comprising a plurality of load sensors, together with an input network, a multiplexer, a reference, an analog to digital converter, and a processor, wherein the input network includes an analog summing network and direct sensor connections to the multiplexer. The multiplexer is arranged to permit measurement of the sum signal, a reference signal, and each direct load sensor signal in a prescribed sequence. The multiplexed signals are converted to digital and processed to derive a weight estimate based on the multiplexed measurements and a system error model. The prescribed measurement sequence permits measurement of the sum signal more frequently than each of the direct signals. A method is described for deriving correction factors for the error model comprising the placing of calibration weights primarily on each weight sensor and solving the system of simultaneous equations for the resulting correction factors.

22 Claims, 9 Drawing Sheets

SCALE SYSTEM

FIG. 1 SCALE SYSTEM

SUMMING NETWORK

ALTERNATE SUMMING NETWORK

EQUIVALENT CIRCUIT FOR INPUT NETWORK

PREAMPLIFIER CIRCUIT

TOP LEVEL SOFTWARE FLOW

DISPLAY PROCEDURE

MTRANS PROCEDURE

MSUM PROCEDURE

ATOD PROCEDURE

| STEP NUMBER | ACTION PERFORMED |
|---|---|
| 1 | MEASURE REFERENCE A, HIGH GAIN |
| 2 | MEASURE SUM |
| 3 | MEASURE REFERENCE A, HIGH GAIN |
| 4 | MEASURE TRANSDUCER A |
| 5 | MEASURE REFERENCE A, LOW GAIN |
| 6 | DISPLAY WEIGHT |
| 7 | MEASURE REFERENCE A, HIGH GAIN |
| 8 | MEASURE SUM |
| 9 | MEASURE REFERENCE A, HIGH GAIN |
| 10 | MEASURE TRANSDUCER B |
| 11 | MEASURE REFERENCE A, LOW GAIN |
| 12 | DISPLAY WEIGHT |
| 13 | MEASURE REFERENCE A, HIGH GAIN |
| 14 | MEASURE SUM |
| 15 | MEASURE REFERENCE A, HIGH GAIN |
| 16 | MEASURE TRANSDUCER C |
| 17 | MEASURE REFERENCE A, LOW GAIN |
| 18 | DISPLAY WEIGHT |
| 19 | MEASURE REFERENCE A, HIGH GAIN |
| 20 | MEASURE SUM |
| 21 | MEASURE REFERENCE A, HIGH GAIN |
| 22 | MEASURE TRANSDUCER D |
| 23 | MEASURE REFERENCE A, LOW GAIN |
| 24 | DISPLAY WEIGHT |
| 25 | MEASURE REFERENCE A, HIGH GAIN |
| 26 | MEASURE SUM |
| 27 | MEASURE REFERENCE A, HIGH GAIN |
| 28 | MEASURE TEMPERATURE |
| 29 | MEASURE REFERENCE A, LOW GAIN |
| 30 | DISPLAY WEIGHT |

FIG. 11

MEASUREMENT SEQUENCE

WEIGHT MEASURING APPARATUS USING A PLURALITY OF SENSORS

BACKGROUND OF THE INVENTION

1. Field of the Invention

The present invention pertains to the field of digital computer based weight measuring devices using low voltage weight transducers, more particularly to weight measuring devices using a plurality of strain gage load sensing elements.

2. Discussion of the Prior Art

Techniques for building weight measuring scales that use strain gage sensors have reached the point where high accuracy is not difficult to achieve by following standard engineering practice; however, the lower priced scales have not used this technology, in part because of the cost and complexity of the necessary electronics. The present invention overcomes much of the cost and complexity of the electronics by employing multiplexing and sampling techniques to permit a single high performance preamplifier and a single analog to digital converter to process the signals from a plurality of load sensors.

Platform scales are commonly constructed with multiple platform support points such that the weight of an object on the platform is distributed among the multiple support points. The determination of the weight of an object on the platform thus involves the summation of the weights measured at each of the support points. Early scales, before electronic weight sensing became available, used levers to transfer this weight to a common point where the weights were summed and coupled to the indicator. When electronic weight sensing became available, a single electronic transducer was coupled to the same mechanical summing point to achieve an electronic weight measurement for digital display or other electronic processing. As the electronics became more affordable and advanced, multiple electronic sensors could be placed at the support points and their signals summed electronically, eliminating the levers and associated mechanical problems.

Examples of this electronic addition technique are described in U.S. Pat. Nos. 4,738,324 and 4,691,794. Borchard in 4,738,324, uses a plurality of capacitive sensors with a variable frequency sensing circuit. Each sensor is measured in turn and the results are used to calculate the weight. This method is subject to sampling latency errors that reduce measurement settling time and generate errors in the presence of lateral motion on the platform. These errors may be significant in the case of live subjects such as people or animals. Larsen et al in 4,691,794, uses strain gage sensors and an electronic adder circuit. This method fails to permit digital equalization of individual sensor scale factors or correction of nonlinearities because the individual sensor states are lost in the formation of the sum signal.

Strain gage based load measurement systems are usually configured as Wheatstone bridge circuits or variations thereof as described in "Strain Gage Based Transducers", a publication of Measurements Group, Inc. Raleigh N.C., 1988, and as illustrated by Griffin in U.S. Pat. Nos. 4,380,175, 4,657,097, 4,799,558, and 4,804,052; and by Larsen et al in 4,691,794; Tullock in 4,739,848; and Langford et al in 5,004,058. The principle problem with Wheatstone bridge implementations is that the bridge is typically coupled to a differential amplifier. These amplifiers are prone to offset errors and offset drift due to temperature and 1/f noise. The present invention overcomes these problems by using a novel input network and sampling technique that allows removing these errors digitally after converting the signals to digital representation.

Switching as a method of sharing a common A/D converter is used by Tullock in 4,739,848, but this method is deficient in that multiple differential preamplifiers are required, one for each strain gage bridge. This not only has the accuracy problems associated with Wheatstone bridge amplifiers as discussed above, but requires additional cost and complexity over the present invention. The present invention uses only one preamplifier and one A/D circuit for ALL strain gage sensors. This simplifies the circuit and results in reduced manufacturing costs.

U.S. Pat. Nos. 4,738,324 by Borchard, and 4,739,848 by Tullock, use signal multiplexing to produce a set of measurements that are summed digitally; however, the differential latency among these measurements results in a weight measurement which is slow to settle and subject to errors from lateral motion. The input configuration of the present invention provides direct signals from the transducers as well as a linear summation signal. These signals are combined in a way that yields a time latency free summation signal which is substantially insensitive to lateral motion errors, and provides the sensor dependent information necessary to correct individual sensors for scale factor, nonlinearity, creep, and temperature. The present invention permits significant gains in accuracy performance over the prior art, while using cost effective electronics.

It is common among recent patents to correct for load off center errors. Several patents, such as 4,799,558, 4,738,324, 4,804,052, and 5,004,058, achieve this by different methods. Griffin, in 4,799,558, uses a sensor responsive to load together with a sensor responsive to load off center placement to derive corrections for the load sensor. Borchard, in 4,738,324, uses multiple capacitive sensors and an algorithm using frequency difference terms to derive the weight corrected for off center placement. Griffin, in 4,804,052, uses multiple digital load cells configured in a network to derive the load off center corrections using a central computer. Langford, in 5,004,058, uses a digital signal to adjust the drive for each load cell together with a calibration method to determine the optimum load cell drive signal. The above methods are variously subject to either differential amplifier errors, or latency errors, or require significant additional circuit or mechanical complexity when compared with the present invention. The present invention utilizes an input network that provides a linear sum and derives corrections from direct measurements of transducer signals. No knowledge of the actual load off center placement is necessary. This input network provides low latency summation signals for accurate measurement of moving subjects such as people or animals, and does so with the minimum number of precision preamplifiers and A/D circuits—permitting a lower cost scale than the prior art methods.

SUMMARY OF THE INVENTION

It is therefore a principle object of the present invention to provide an input network and multiplexing circuit that allows digital error correction, fast response, and insensitivity to errors from lateral motion, while defeating the limitations of the prior art.

According to the present invention, the weight sensing transducers are connected to a novel unipolar input network which produces a set of signals resulting from a combination of transducer signals, said set comprising substantially direct sensor signals and a summation signal. These signals, together with a reference signal, are multiplexed in a prescribed sequence which maximizes display update rate and minimizes measurement errors. The configuration of the multiplexer and sampling electronics further minimizes the effect of component errors and noise sources.

In one embodiment, the sampling sequence is designed to update the sum signal measurement more frequently than the direct signal measurements in order to maximize the display update rate. This sequence is arranged to provide reference measurements directly preceding or directly following the associated signal measurement, or both preceding and following the signal measurement to minimize offset errors and noise. The multiplexed signals are amplified by an amplifier with a high impedance input and presented to an analog to digital converter which converts these signals to their digital representations. A processor then utilizes these digital representations and a mathematical error model to derive a computed weight estimate, which is provided as the weight measurement output.

It is a further object of the present invention to provide a method for determining the coefficients of the system error model so that they may be stored in the apparatus and used for computing the weight estimate. According to the present invention, an iterative solution for the coefficients is provided that may be used with a system of linear or nonlinear equations describing the responses of the transducers. This method utilizes a set of transducer signal measurements with a calibration weight placed in multiple locations such that each transducer is the dominant response signal in the associated equation.

Thus the combination of input network, multiplexing configuration, sampling sequence, and digital processing utilized by the present invention provides for a weighing apparatus with higher accuracy, stability, and precision, using low cost components and manufacturing techniques, than is available using prior art techniques.

BRIEF DESCRIPTION OF THE DRAWINGS

These and other features and advantages of the present invention will be better and more completely understood by studying the following detailed description of the presently preferred exemplary embodiment in conjunction with the drawings, of which:

FIG. 11 is a listing of the exemplary signal sampling sequence performed by the system shown in FIG. 1.

DETAILED DESCRIPTION OF THE PREFERRED EMBODIMENT

Figure 1:
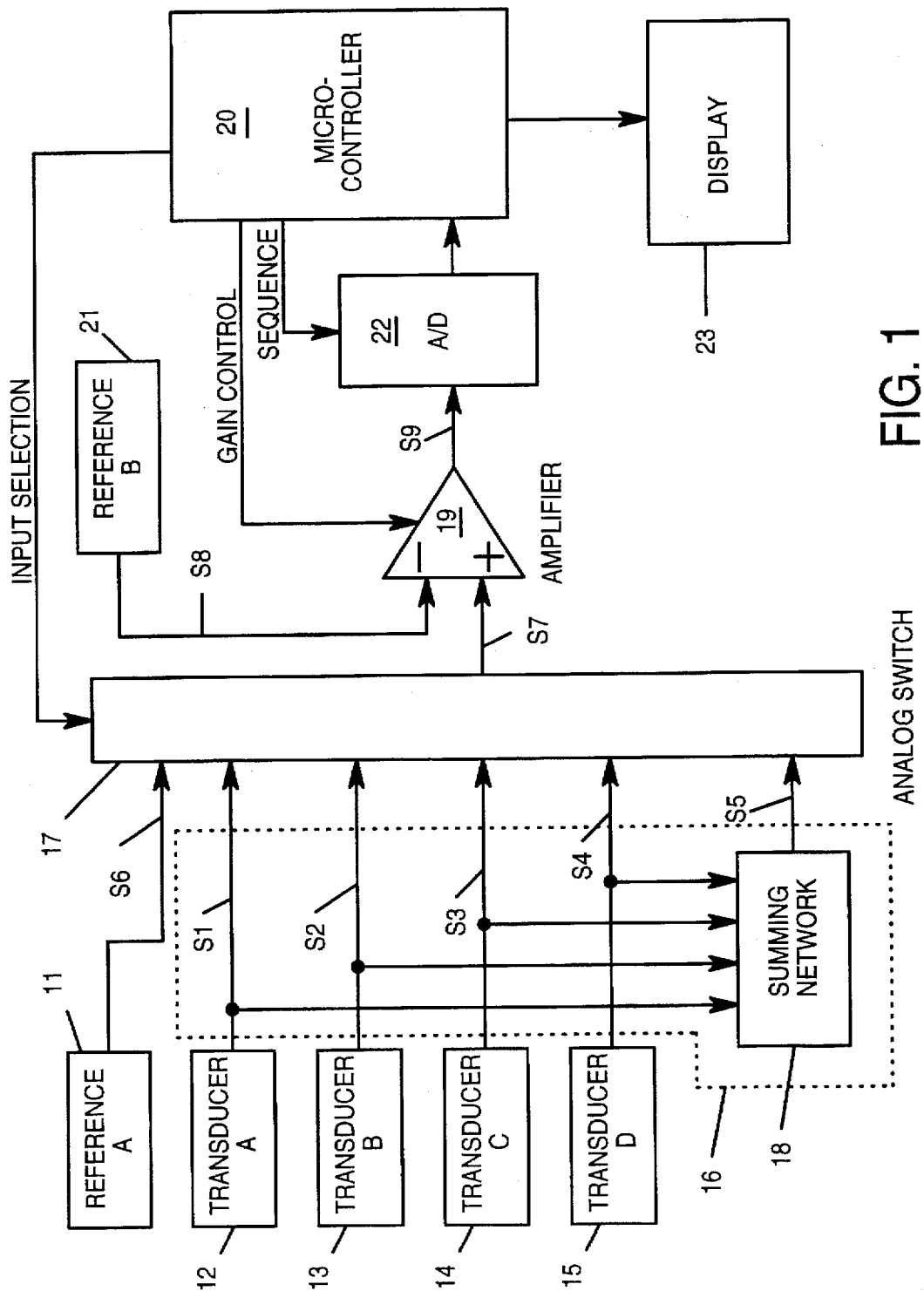
FIG. 1 is a schematic block diagram of the presently preferred exemplary embodiment of a weight measuring scale system in accordance with the present invention.

Further objects, benefits and features of the present invention will become evident from the following discussion of the presently preferred embodiment shown in FIG. 1, which is a schematic block diagram of a weight measuring scale system in accordance with the present invention. S1–S9 refer to the signals on the associated wires in the diagram. Reference A 11 is a resistive voltage divider powered from the same source as the transducers to provide a stable reference signal relative to the transducer signals. This configuration has the advantage that it is free of amplifier related errors due to offset and noise that would be present in a buffered reference signal. Transducers A 12 through D 15 produce output signals S1 through S4, respectively. These signals are applied to an input network 16 which comprises direct sensor connections to the analog switch 17 together with a summing network 18, which is also connected to the analog switch 17. These transducer signals, together with Reference A signal S6 and the summation signal S5 from the summation network 16, are multiplexed using the analog switch multiplexer 17 to the input of amplifier 19 according to control signals from micro controller 20. Amplifier 19 is also connected to reference b 21 and has a gain selection controlled by microcontroller 20. The output signal of the amplifier 19 is converted to a digital signal by the Analog to Digital (A/D) converter circuitry 22. The micro controller 20 processes the digital information from all of the measurements to derive a weight measurement that is displayed on the display device 23.

The input configuration comprising: (1) the transducers 12–15, (2) input network 16, (3) analog switch 17, and (4) preamplifier 19 provides multiple advantages over the prior art. These advantages inherently reduce sensitivity to potential error sources while permitting maximum use of digital correction techniques for the remaining errors and minimizing the requirement for complex and/or expensive electronics.

This configuration is well adapted to strain gage based transducers, or other low voltage transducers, because of its inherent insensitivity to offset and offset drift effects that are present in even the best precision amplifiers. This configuration also tolerates and corrects for cross coupling effects due to any finite (non-zero) source resistance of the transducers.

Whereas the preferred exemplary embodiment uses four transducers 12–15, scales with any number of transducers may benefit from the present invention. Four transducers are typical of small platform scales; even a single transducer configuration may take advantage of the low offset features of the input multiplexer. As many as six to twelve are common for large truck weighing scales. In the limit, a very large number of transducers may result in significant signal attenuation in the summing circuit to the point that system accuracy could suffer. In the case of a large number of transducers, a multiplexing of several summing networks, connected to subsets of the transducers, may be used to divide the load. This technique would result in less attenuation in the summing circuit, at the possible expense of increased weight estimate latency error.

Figure 2:
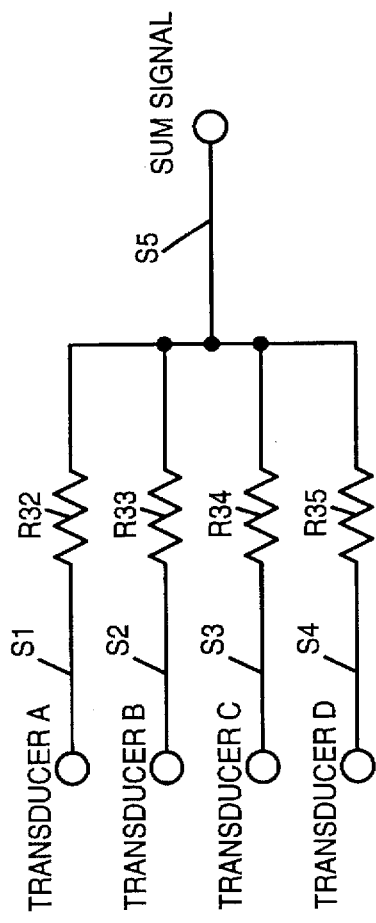
FIG. 2 and FIG. 3 are more detailed schematic diagrams of the summing network of the system shown in FIG. 1.

FIG. 2 is a schematic diagram of the exemplary signal summation network 18 of the preferred embodiment. Low impedance transducer signals are connected to their respective input nodes and the summation signal S5 is made available at the sum signal output. In the preferred embodiment, all of the transducers have approximately equal sensitivity and R32 through R35 have approximately equal resistance which is greater than the transducer equivalent source resistance.

The input network 16 allows for the direct sensing of transducer signals S1–S4 as well as the sensing of a summation signal S5, representing an approximate sum of the weights on the transducers 12–15. The direct transducer signals S1–S4 are used to derive sensor states and histories, valuable in determining correction factors of a sensor error model. The summation signal S5 provides a TIME LATENCY FREE summation that is INSENSITIVE to the lateral motion of live loads on the platform. Note that this lateral motion is distinct from the off-center or load shift error commonly described. This lateral motion error is due to the velocity or rate of motion of off-center forces rather than the static value of these forces.

To gain an appreciation of the potential magnitude of the error due to lateral motion and the need for correction of this error, the following discussion is provided: Consider a two load cell scale with one load cell in front and a second load cell in back; said scale measuring a 100 kilogram person who is rocking forward at a 5 centimeter per second rate. If the load cells are 50 cm apart, the resulting load change rate observed at the load cells is an increase of 10 kg per second on the front load cell and a decrease of 10 kg per second on the back load cell. If the signal sample rate is 10 samples per second, this results in a positive one kilogram per sample load change rate on the front load cell and a negative one kilogram per sample load change rate on the back load cell. If, at a given sample time, the front load cell measures 50 kg and the back measures 50 kg, the next sample would result in a measurement of 51 kg on the front and 49 kg on the back. A sampling system that samples the back load cell during the first sample time and the front load cell during the second sample would result in a weight sum of 101 kg; whereas, the analog summing network, which continuously provides an immediate sum, would maintain a correct 100 kg sum throughout the measuring interval. This latency error can cause considerable instability in a scale designed for weighing people or animals to one tenth of a kilogram (0.1 kg) resolution.

Whereas this process does not correct for weight errors due to vertical acceleration of the subject, it DOES provide a dramatic improvement in the typical settling time and stability of measurements involving live loads. This is because the greatest effect of typical live motion is lateral motion rather than vertical acceleration. Vertical acceleration is typically higher in frequency and is more easily filtered than load shift motion.

Figure 3:
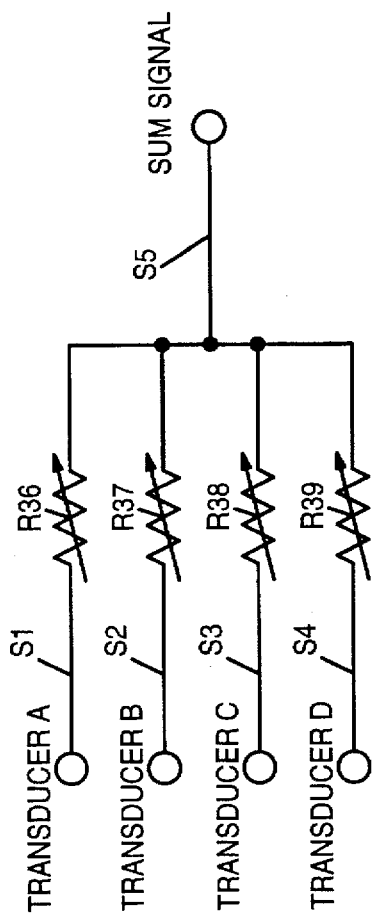

FIG. 3 is a schematic diagram of an equivalent exemplary signal summing network 18 wherein the resistor elements R36–R39 are adjustable. This configuration provides a method of equalizing the scale factor of each sensor in the suite where it may not be possible or desirable to perform the automatic calibration procedure. This feature also permits minimizing the magnitude of the digital scale factor correction terms, which are subject to time latency and delay the settling of the least significant bits. It may be appreciated by those skilled in the art that the variable resistor elements may be implemented as networks comprising fixed and variable elements to provide greater ease and accuracy of adjustment.

An alternative to the input network of the present invention could be to sample ALL sensors at the same time using independent sample and hold circuits, independent A/D converters, and/or to sample them rapidly using a fast A/D converter. These techniques, however, are expensive and involve other errors. The method of the present invention thus enables high accuracy using low cost integrating A/D converters.

Figure 4:
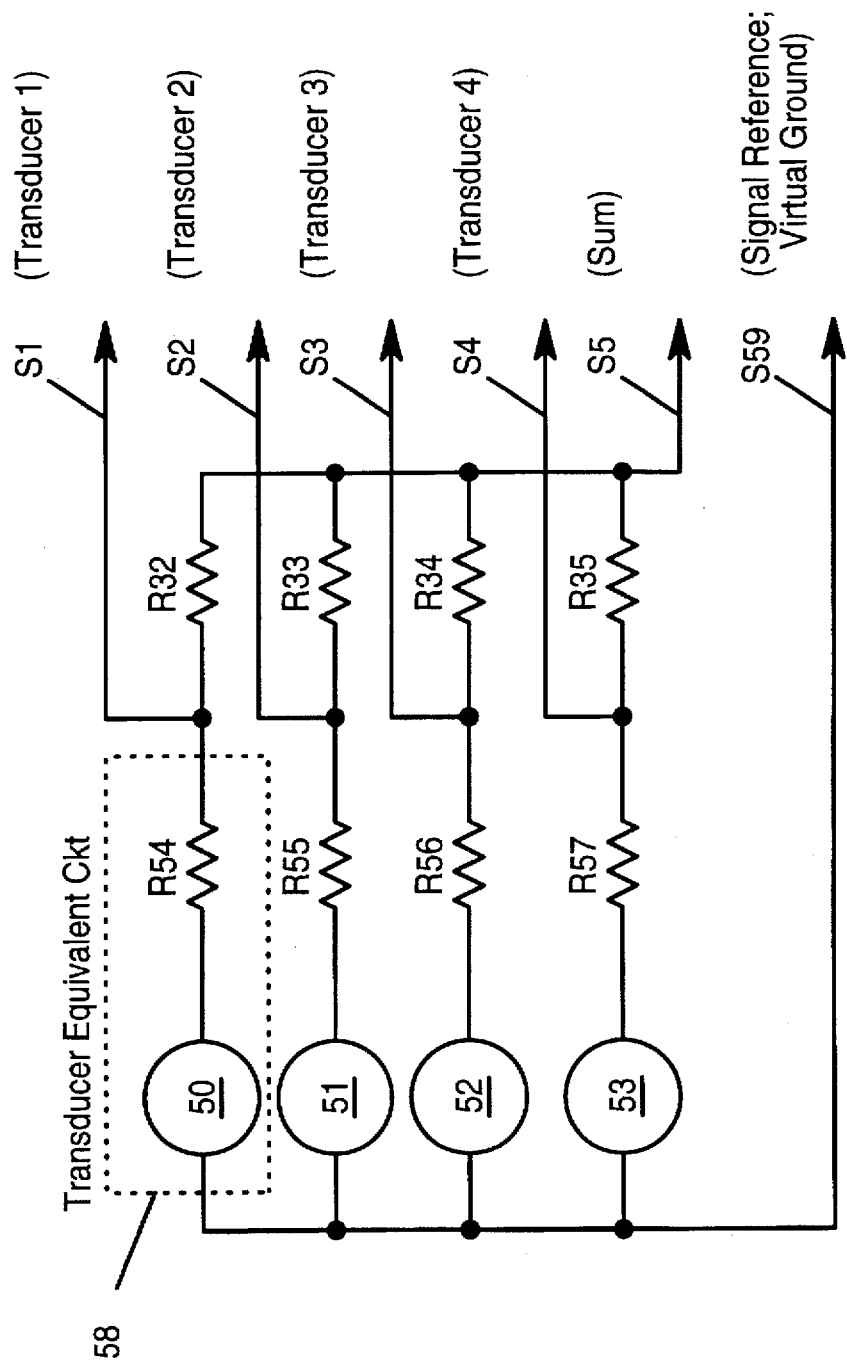
FIG. 4 is a schematic diagram of the equivalent circuit of the transducers and input network of the system shown in FIG. 1 for reference in analysis discussions herein.

FIG. 4 is an equivalent circuit for the transducer suite connected to the input network of the preferred embodiment. The voltage generators 50–53 represent the Thevenin equivalent representation for the respective transducer signals resulting from the distributed weight on each. The resistors, R54–R57 represent the Thevenin equivalent source resistance for each respective transducer. The combination of voltage generator 50 and equivalent resistor R54 represents the Thevenin equivalent circuit 58 for weight Transducer A 12 shown in FIG. 1. R32–R35 comprise the summing network 18 of FIG. 1. S1–S4 are the signals that result from direct connection to the transducers. These signals and the sum signal S5 are sampled according to a prescribed sequence by the analog switch multiplexer 17, which is controlled by the microcontroller 20. S59 is a virtual signal return node presented as a convenience in this analysis. S59 is not directly available for measurement in the physical realization of the circuit.

In the ideal case, the transducer source resistances R54–R57 are identical and the summing resistances R32–R35 are also equal to one another. For the ideal case, the sum voltage S5 is:

$$(1) S5 = (E1+E2+E3+E4)/4$$

where E1 through E4 are the respective Thevenin equivalent signals 50–53 for the transducers A–D 12–15.

S5 is thus a signal that represents a summation of the weight applied to all transducers. In a practical case, there will be slight variations among transducer scale factors and resistor values. Errors resulting from these variations can be corrected using the direct signal measurements S1 through S4 and their associated correction factors described herein.

The direct signals, S1 through S4, primarily result from the associated transducer, but because of finite transducer source impedance, these signals are seen to include contributions from all transducer signals. Analysis yields:

$$S1 = k1*et1 + k2*(et2+et3+et4)$$

where, et1, et2, et3, et4 are the Thevenin equivalent voltages of the transducer signals 50–53 respectively.

k1 and k2 are voltage divider ratios resulting from analysis of the resistor network of FIG. 4 and are defined by the following relationships:

$$k1 = (Rb+(Ra+Rb)/3)/(Ra+Rb+(Ra+Rb)/3)$$

$$k2 = Ra/n*(Ra+Rb)$$

where,

Ra is the Thevenin equivalent resistance of a transducer;

Rb is the resistance of a summing network resistor (all summing network resistors are equal for this idealized analysis);

n is the number of transducers.

For the exemplary case of the preferred embodiment, Rb is twenty (20) times Ra and n is four (4), resulting in:

k1 = 27/28 = 0.964;

k2 = 1/84 = 0.012;

n = 4.

Which results in:

$$S1 = 0.964et1 + 0.012(et2+et3+et4);$$

Thus, for a typical case, the signal resulting from the direct connection is substantially due to the associated transducer with a slight, but significant contribution from the remaining transducers. Also, in a practical implementation, the direct and cross effects would all have slightly different values for each branch of the circuit due to resistor tolerances and transducer sensitivity differences. The calibration method described herein solves the equations that take all of these non-ideal effects into account.

Although the summation signal S5 is near ideal in terms of data latency, it contains other errors. These include individual transducer scale factor uncertainty, nonlinearity, and creep errors that cannot be resolved based on the sum signal S5 alone. In order to resolve these errors, the load state, and, in the case of creep errors, the past history of the load state, must be known for each individual transducer 12–15. The direct transducer signals S1–S4 provide the necessary information to derive these states. These states are then combined with the digitized sum signal S5 and error correction model to derive the corrected weight measurement.

In the case of a linear system model with scale factor errors, the contribution of a given transducer 12–15 to the sum S5 is dependent on both the transducer scale factor and the series summing resistor R32–R35 associated with the particular transducer. The result is that the scale factor correction for each transducer branch also corrects for resistor tolerance variations. This permits the use of less expensive wider tolerance resistors than would otherwise be permitted.

This dependency of the sum S5 on both the transducer 11 scale factor and associated series resistor R32 value suggests several system variations based on equivalent summing networks 18:

(1) The resistors R32–R35 may be different values from one another as a means of accommodating transducers 12–15 with different scale factors.

(2) The resistors R36–R39 may be adjusted as a means of correcting the sum S5 as shown in FIG. 3.

Although the correction method used with the input network 16 of the present invention works properly even with the sum S5 containing wide errors, an accurate sum S5 minimizes the magnitude of the correction terms, which are subject to latency error.

Figure 5:
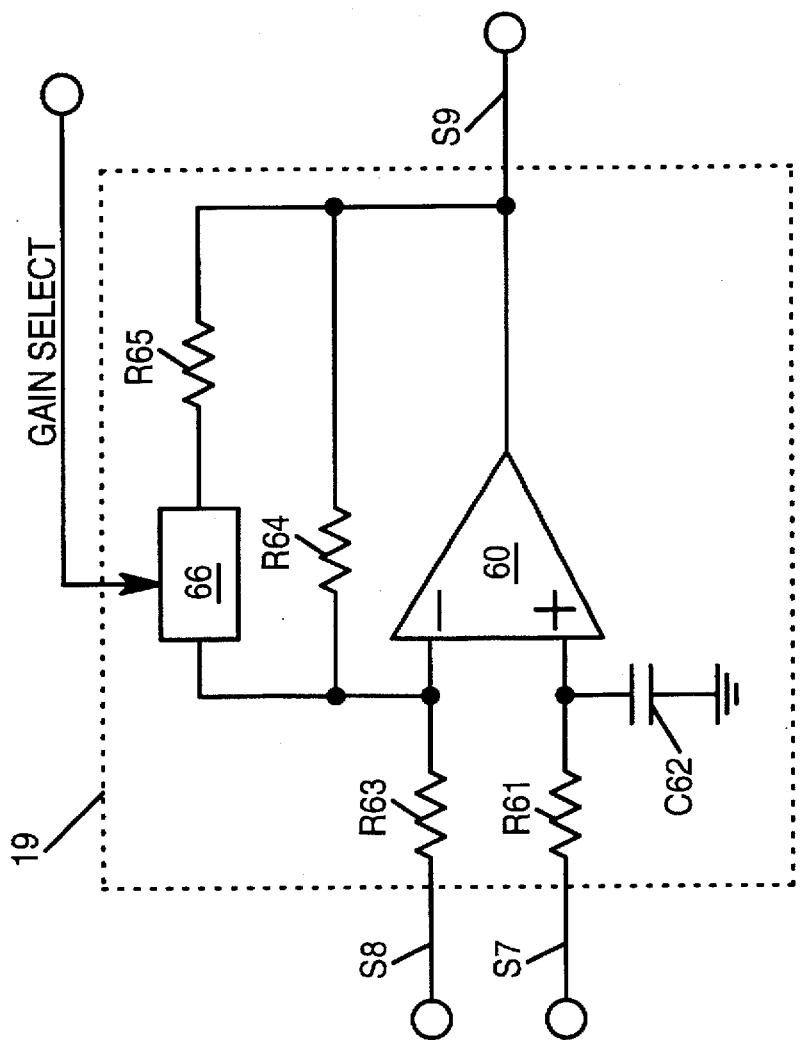
FIG. 5 is a detailed schematic of the preamplifier shown in FIG. 1.

FIG. 5 is a more detailed schematic diagram of the amplifier 19 of FIG. 1. This circuit is based on a precision operational amplifier 60. Note that this amplifier is NOT configured as a differential amplifier connected to a Wheatstone bridge, as is the typical configuration for prior art strain gage applications. All transducer signals S1–S4 together with the sum signal S5 and Reference A signal S6 are multiplexed through R61 to the high impedance positive input of the precision operational amplifier 60. This presents a high impedance load to the analog multiplexer which minimizes the IR (voltage) drop across multiplexer switch elements. This in turn minimizes potential errors due to temperature effects of the non-ideal multiplexer resistances. The RC network R61, C62 form a low pass filter that reduces the effects of transients and Radio Frequency Interference (RFI). The resistors R63 and R64 form the gain setting network for the high gain case. R65 is connected by the analog switch 66 to lower the gain for the low gain case. Reference B 21 (FIG. 1) sets the bias reference for the amplifier and is applied through R63. This reference may be implemented with a resistor network. The analog switch 66 as well as the multiplexer 17, may be implemented with inexpensive commercial components including, but not limited to CD4066, CD4051, CD4052, and CD4053.

The amplifier 19 has several features that work together with the input configuration of the present invention to minimize errors in the measurements. These features include a high impedance input, periodic reference measurement, and dual gain selection.

Since the analog switch elements used to form the multiplexer 17 have a temperature dependent internal resistance, this resistance is a potential source of measurement errors. This resistance forms a voltage divider with the amplifier input impedance, reducing, slightly, the input signal to be measured. A high impedance input, as used by the present invention, can reduce this effect to a negligible level. For example, if one part per thousand were the required stability of this element of the scale system, and the analog switch deviates 30 ohms from its center value over temperature, the amplifier input resistance would have to be 30,000 ohms or greater to adequately suppress this error source by forcing the variable part of the voltage divider to a magnitude of less than one part in 1000. Input resistances of much greater than this value can be achieved by configuring a precision operational amplifier in a positive gain configuration as illustrated in FIG. 5, which virtually eliminates this error source for typical implementations.

The signal input set includes a reference 11, which is used to correct amplifier offset errors. Since the transducer signals S1–S4 and reference S6 use the SAME amplifier input, they are subject to the same offset, thus periodic reference measurements can therefore be used to remove offset errors from the transducer signal S1–S4 and sum S5 measurements, as shown later in equations (3), (4), and (5).

The optional gain selection capability of the amplifier 19 provides additional signal to noise performance and improved accuracy. This is because the signal attenuation effect of the summing network 18. Since the sum signal S5 is the primary weight determining signal, the gain must be optimized for this signal. When the direct signals S1–S4 are measured with this same gain setting, they may overload the amplifier 60 if the weight is primarily distributed to one weight transducer 12–15. This overload may be corrected by reducing the gain for the individual weight transducer signals S1–S4.

When the gain is changed, the effective offset voltage of the amplifier 60 also changes, necessitating a separate measurement of the reference S6 for each gain setting and the strict association of signal 12–15 and sum S5 measurements with reference measurements made with the SAME gain setting. This process is reflected in the sequence shown in FIG. 11.

Figure 6:
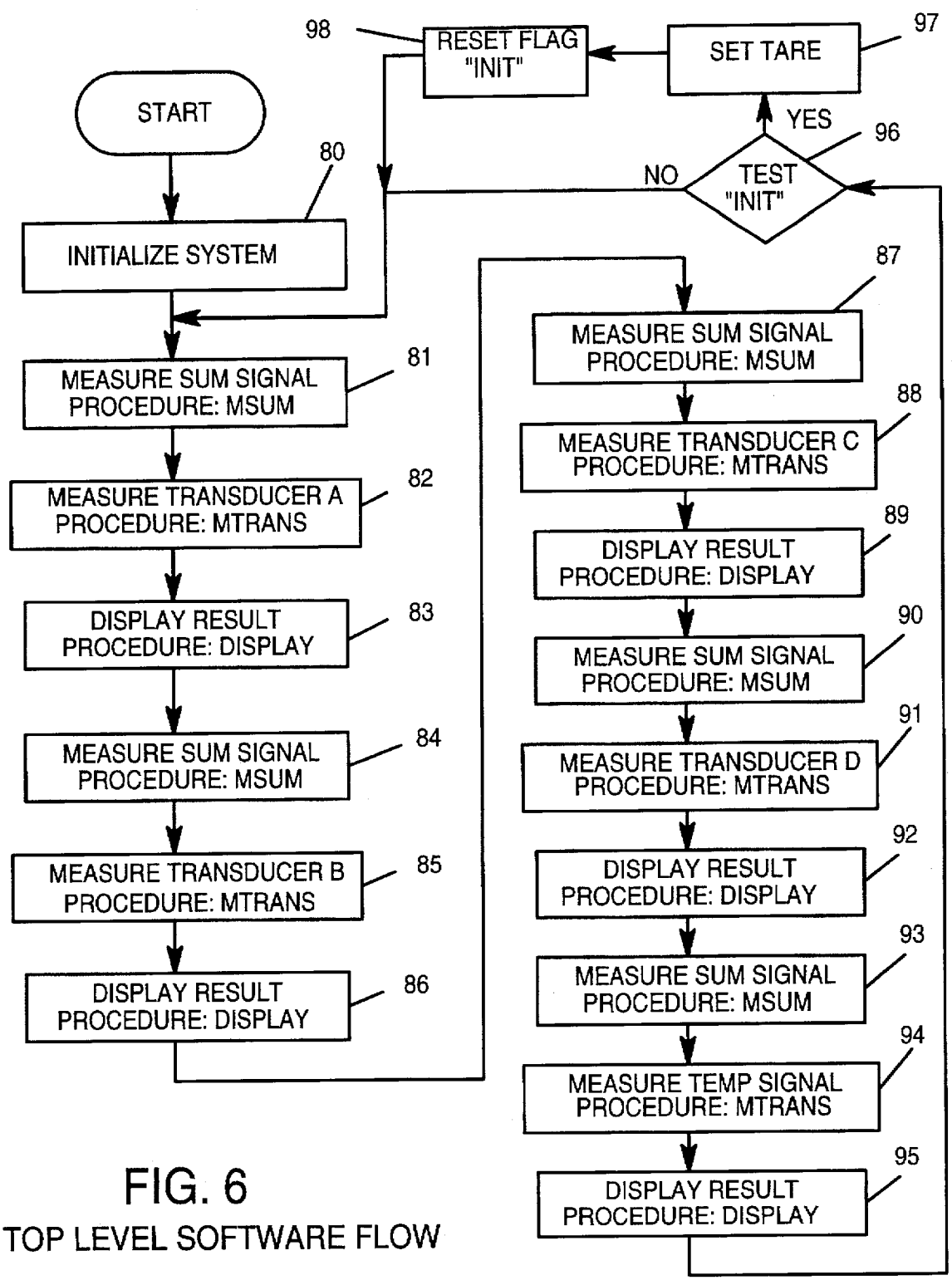
FIGS. 6–10 are flow chart schematics of the exemplary program control steps performed by the system shown in FIG. 1.

FIG. 6 is the schematic block diagram of the exemplary top level software flow for the preferred embodiment. At power up, the system initialization 80 step reads the calibration constants from EEPROM memory and sets other default values, as necessary. A tare operation is then performed automatically to set the initial value of zero for the scale. This subtracts all offsets resulting from amplifier and transducer biases as well as platform and container weight that may be present during the operation. This is done by setting flag "INIT" to indicate initialization so that tare values will be stored after the first data acquisition cycle. The main loop, steps 81 through 96, performs measurement and display functions continuously until power off. Steps 81–83 measure a sum signal and one transducer signal, after which a new weight measurement is calculated and displayed. Steps 84–86 repeat this process for a different transducer signal; steps 87–89 and 90–92 complete this process for the remaining transducers. Steps 93–95 acquire a temperature measurement with a similar subsequence. The "INIT" flag is tested 96 and if set, tare values are stored 97 and the flag is reset 98. Control is then returned to the beginning of the main loop which continues until power off.

Figure 7:
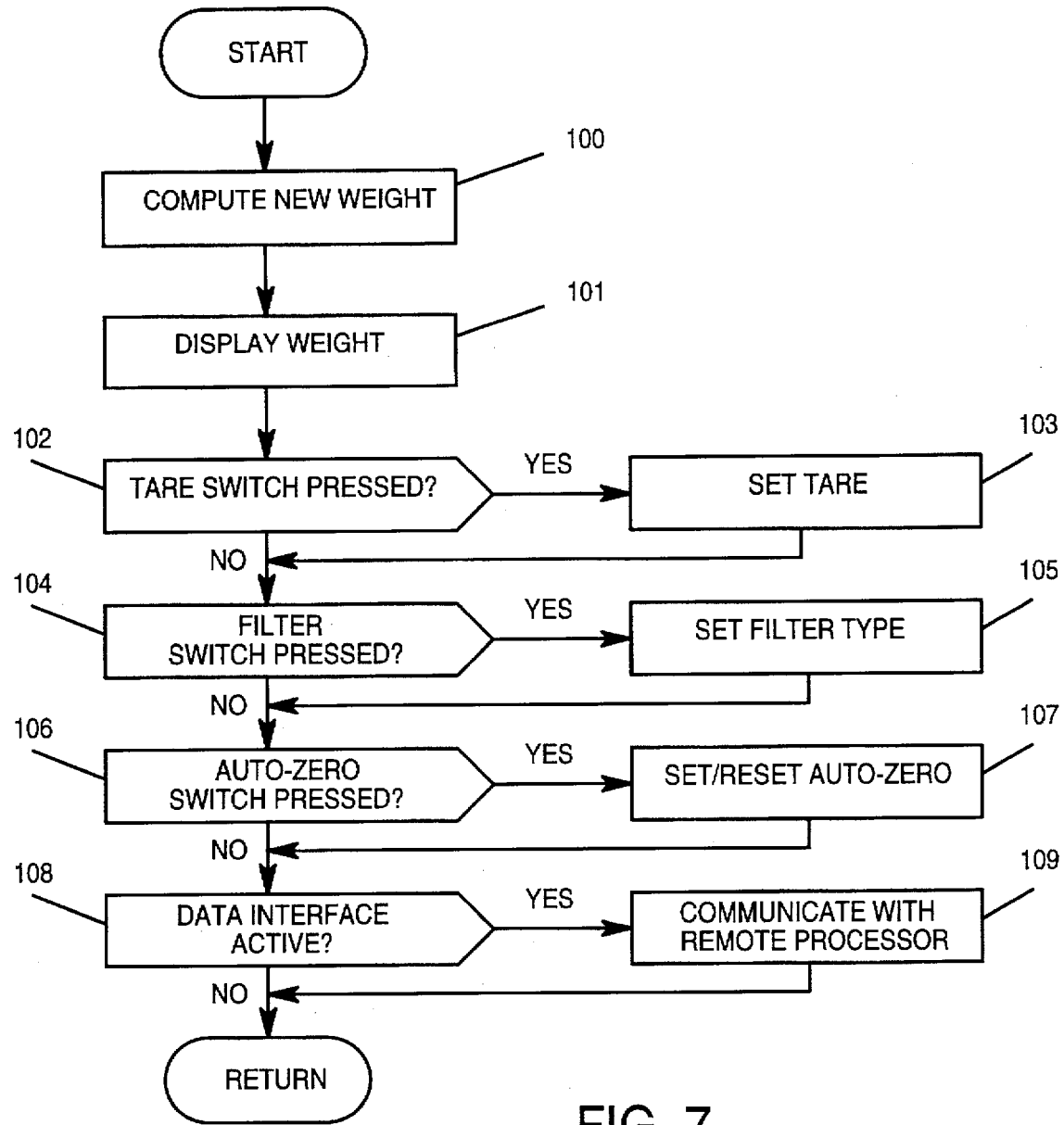

FIG. 7 is the schematic block diagram of the exemplary software flow for the "DISPLAY" procedure used by the preferred embodiment. Step 100 of this procedure first calculates a new weight using equation (2) described herein. The weight is then displayed 101 and the user input switches are tested 102–106. If the tare switch is depressed, the current offset values are stored in the tare variables 103. If the filter switch is depressed 104, the filter selection number is incremented 105, (incremented using modulo arithmetic of modulo n, where n is the number of available selections) and a new filter is designated for the weight processing function. If the auto zero switch is pressed 106, the auto zero mode is toggled 107. The data interface is then tested for a communications request 108, and if active, communications are handled and any commands are processed 109. These commands include uploading and downloading of measurements and information needed during calibration. Control is then returned to the calling program.

Figure 8:
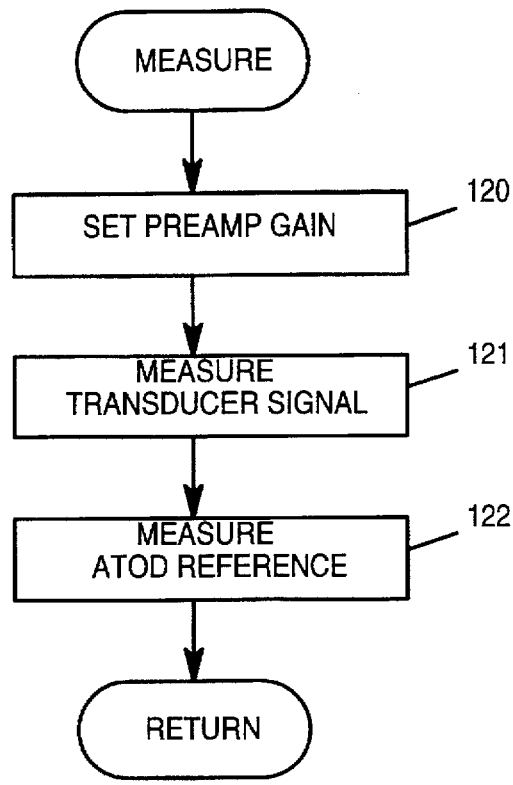

FIG. 8 is the schematic block diagram of the of the exemplary software flow for the "MTRANS" procedure used by the preferred embodiment to measure a transducer (S1–S4) signal. The preamplifier gain is set 120, the temperature) is then selected and the signal is convened to digital and stored for later calculations 121. The reference is then selected and its signal is converted to digital and stored for later calculations 122.

Figure 9:
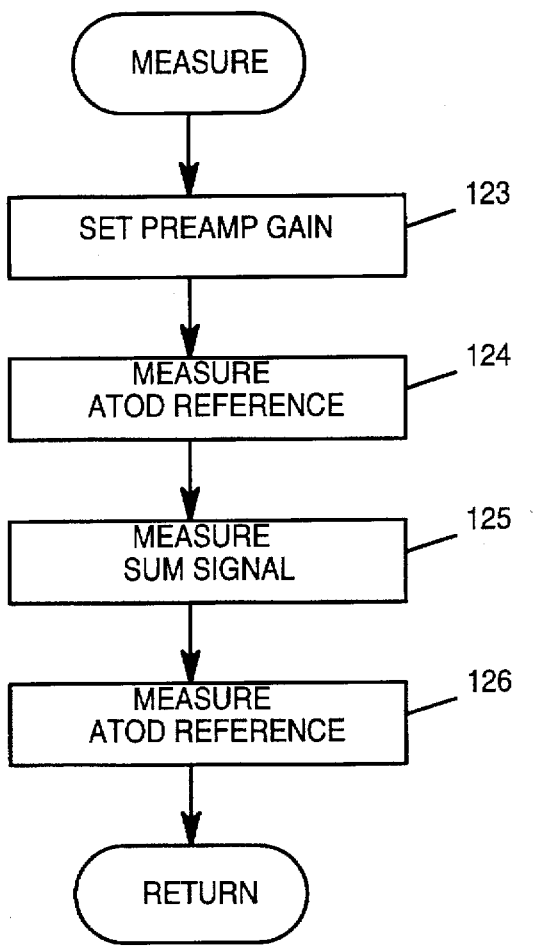

FIG. 9 is the schematic block diagram of the of the exemplary software flow for the "MSUM" procedure used by the preferred embodiment to measure a SUM (S5) signal. The preamplifier gain is set 123, the reference is selected and its signal level is convened to digital representation and stored for later calculations 124. The sum (S5) signal is then selected and converted to digital and stored for later calculations 125. The reference 11 is then selected and its signal S6 is convened to digital and stored for later calculations 126. This sequence illustrates the optional use of two reference measurements to obtain a better estimate of the op amp 19 offset error during the sum signal S5 measurement. Due to 1/f noise, the op amp 19 offset slowly drifts such that the average of the two offset measurements, before and after the signal measurement, provides a better estimate of the correct offset during the time of the signal measurement than either measurement alone.

Figure 10:
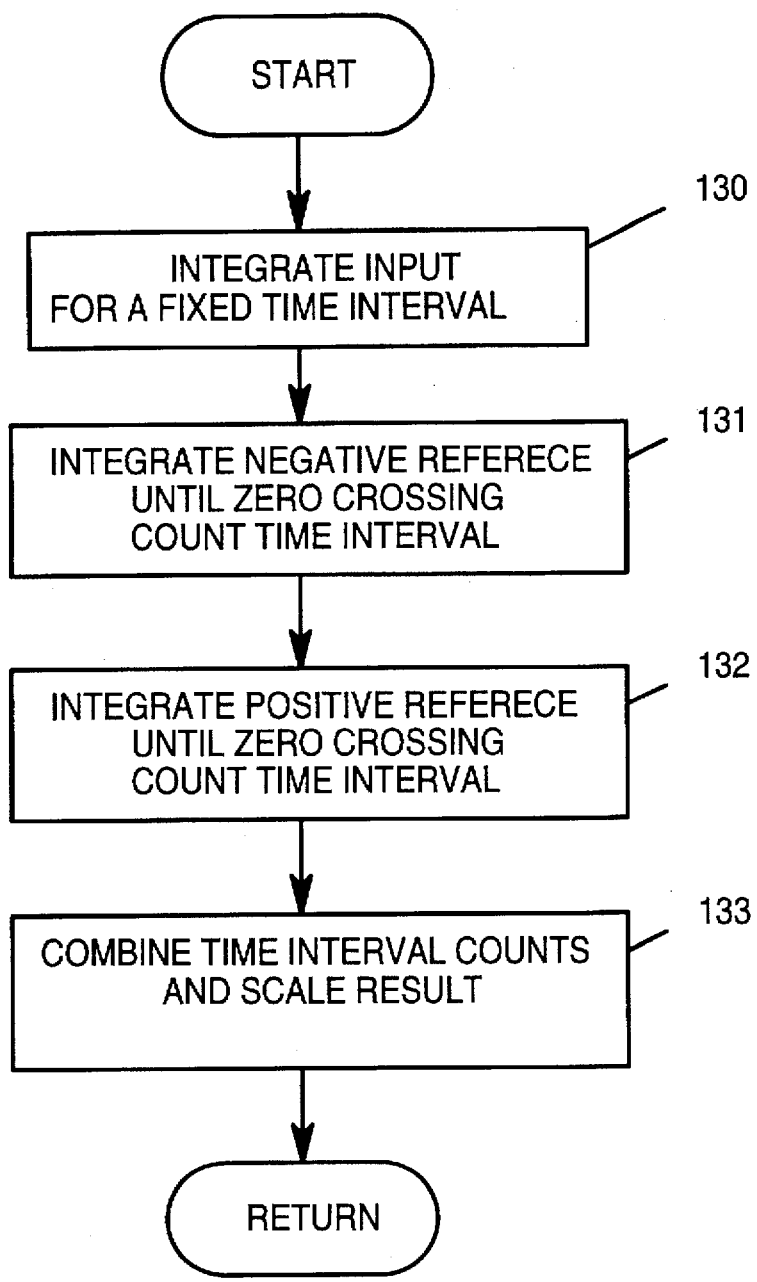

FIG. 10 is the schematic block diagram of the of the exemplary software flow for the "ATOD" procedure used by the preferred embodiment. This procedure implements a triple slope analog to digital (A/D) converter which is common in the literature, but is shown here for clarity and to illustrate additional advantages and features of the present invention. This technique has at least three desirable properties:

(1) it is a very low cost method of deriving a high resolution digital representation of a signal;

(2) the integration process reduces noise in the measurement;

(3) the integration interval may be selected to be a multiple of the AC power line cycle time to minimize interference from the power mains.

The software procedure shown in FIG. 10 operates hardware elements that select inputs, perform the integration and detect zero crossing. The steps are as follows:

(1) The input signal is integrated for a fixed length of time 130;

(2) a fixed negative voltage is then selected and integrated and timed until the integrator output crosses zero 131;

(3) said time is recorded, and a positive voltage is integrated and timed to a second zero crossing 132, which is used to measure the overshoot resulting from the second integration;

(4) these two timings are then combined into a measurement of the input voltage, and control is returned to the main program.

FIG. 11 is a listing of the exemplary signal sampling sequence performed by the system shown in FIG. 1. The total sequence, including steps 1–30, samples all four sensors and the summation and reference signals in a manner that provides for frequent display updates, minimizes the effect of slow drift in amplifier offset due to 1/f noise, and minimizes the effect of lateral load motion due to data latency effects.

In this sequence, the sum S5 is sampled more frequently than the transducer signals S1–S4 because it has the greatest effect on the determination of the weight measurement. The individual transducer signals S1–S4 are sampled less frequently because they are used for producing SMALL corrections to the main signal S5 with the consequence that errors in the measurement of these signals will have minimal effect on the resulting weight measurement.

One feature of this sequence is that the reference signal S6 is measured frequently and just BEFORE and/or AFTER an associated signal measurement. This is to reduce the effect of drift and 1/f noise in the amplifier 60 circuits. An optional feature of this sequence allows the sum signal S5 to be compared with two measurements of the reference signal S6—one taken just BEFORE, and another taken just AFTER the sum signal S5 is measured. The average of these two reference measurements is a more accurate estimate of the value of the reference signal S6 during the time of the sum signal S5 measurement than either of the reference measurements alone.

Another feature of this sequence is that the sum signal S5 is sampled more frequently than the individual transducer signals S1–S4, and for each sum measurement, a new weight measurement is calculated. The alternate sampling of transducer and summation signal shown in FIG. 11 (i.e., S1, S5, S2, S5, S3, S5, S4, S5) permits a faster display update rate than would be possible with a sequence that samples all signals before updating the display (i.e., S1, S2, S3, S4, S5).

This sequence includes measurements of the Reference A signal S6 with each of the two gain settings. Since the gain setting affects the apparent offset of the amplifier, a separate offset reading and offset tare value is necessary for each gain setting.

It may also be noted that the individual transducer signal S1–S4 measurements have only one associated reference S6 measurement; whereas, the sum signal S5 has two. This is because the transducer measurements S1–S4 are multiplied by the associated correction factors, which are typically less than one percent. This process results in low sensitivity to errors from the individual transducer S1–S4 measurements. The added accuracy of dual reference measurements is NOT significant.

This sequence also illustrates how a temperature sensor measurement may optionally be added to the sequence. In this embodiment, the temperature sensor measurement 94 is included with another sum signal S5 measurement 93 and weight display step 95 to maintain the symmetry of the step sequence. This simplifies the software implementation.

It will be apparent to those skilled in the art that this exact sequence is not the only possible sequence with these valuable properties, but that numerous other sequences may be easily formed by rearranging the order of the items and/or by adding and/or deleting items to suit a particular application. All sequences with these general properties are intended to be included in the spirit of the claims hereinafter claimed.

Signal Processing

After the signals are converted to digital representation, they are processed by the digital computer 20 to derive a weight estimate which is then displayed on an LCD display 23 and/or utilized by another device. This processing utilizes the direct signals S1–S4 to correct for errors in the summation signal S5 and to compute the resulting weight estimate.

A schematic block diagram of the exemplary signal processing of the preferred embodiment is depicted in FIG. 6. This figure illustrates the initialization and subsequent steps that form a loop that continues until power is turned off. It can be seen in this figure that each time a sum signal is sampled, the "DISPLAY" routine is called. This routine calculates and displays the weight, checks the user input switches and interfaces with an external processor, if necessary.

The "DISPLAY" routine, shown in FIG. 7, combines calibration, tare, and current measurement data to yield a weight measurement. For the preferred embodiment, the weight is determined using a linear combination of the most current measurements according to the following formula:

$$(2) \quad weight = sum*sfsum + a*sfa + b*sfb + c*sfc + d*sfd$$

where,

"*" represents multiplication;

"+" represents addition;

"weight" is the current weight estimate of the system;

"sum" is the tare adjusted measurement from signal S5;

"sfsum" is the scale factor associated with the sum determined during the calibration process;

"a" is the tare adjusted measurement from transducer A S1;

"sfa" is the associated correction factor for "a" determined during the calibration process;

"b" is the tare adjusted measurement from transducer B S2;

"sfb" is the associated correction factor for "b" determined during the calibration process;

"c" is the tare adjusted measurement from transducer C S3;

"sfc" is the associated correction factor for "c" determined during the calibration process;

"d" is the tare adjusted measurement from transducer D S4; and

"sfd" is the associated correction factor for "d" determined during the calibration process.

The variables "a, b, c, d" are tare adjusted measurements, i.e. transducer measurements with reference and tare subtracted as follows:

$$(3a) \quad a = (txa - refa) - (txatare - refatare)$$

$$(3b) \quad b = (txb - refa) - (txbtare - refatare)$$

$$(3c) \quad c = (txc - refa) - (txctare - refatare)$$

$$(3d) \quad d = (txd - refa) - (txdtare - refatare)$$

where, txa, txb, txc, txd, and refa, are the digital representations of the respective transducer S1–S4 or reference S6 signals;

txatare, txbtare, txctare, and txdtare, are the digital representations of the respective transducer S1–S4 signals at the time of the last tare command;

refatare is the digital representation of the reference signal at the time of the last tare command.

The variable "sum" in equation (2) is the tare adjusted measurement from signal S5 with tare and reference measurements subtracted as follows:

$$(4) \quad sum = (E5 - refas) - (sumtare - refastare)$$

$$(5) \quad refas = (refas1 + refas2)/2$$

where, refas1 and refas2 are the Reference A S6 measurements before and after the measurement of S5 respectively;

sumtare is the digital representation of the sum signal S5 at the time of the last tare command; and refastare is the value of refas at the time of the last tare command.

Whereas this example uses a linear error model, the model may be extended to include errors due to nonlinearities and creep by the inclusion of appropriate terms in equation (2), and the expansion of the calibration procedure to characterize these terms.

System Calibration

The calibration process determines the scale factor correction constants which are written into EEPROM or other non-volatile memory devices for later use in determining weight measurements. This process is performed once, or periodically as required to ensure the system maintains adequate calibration accuracy.

The calibration process for the preferred embodiment comprises the steps of:

a) initial thermal stabilization by powering the circuit as required, typically for several minutes;

b) measurement of system offsets with zero weight on platform;

c) measurement of signals with weight evenly distributed to all load cells;

c) measurement of signals with weight primarily on load cell A;

d) measurement of signals with weight primarily on load cell B;

e) measurement of signals with weight primarily on load cell C;

f) measurement of signals with weight primarily on load cell D;

g) solving the system of equations to determine the five scale factors for use in equation (2).

If it can be arranged to place the calibration weight on each transducer 12–15 individually without disturbing the quiescent state of the other transducers, the solution of the equations is trivial; however, it is not necessary to fully separate the calibration measurements in order to obtain a good solution.

Since this is a system of more equations than unknowns, a family of solutions exists. Solution sets that minimize the magnitude of the correction factors are preferred because these sets will tend to minimize the effect of latency on the correction terms. The preferred embodiment uses an iterative approach to the solution that results in a zero coefficient for one of the correction factors.

The method is based on equation (2), repeated herein below for convenience:

$$(2) \quad weight = sum*sfsum + a*sfa + b*sfb + c* \ sfc + d*sfd$$

The individual correction factor terms can be derived if a known weight is placed on the scale. The steps are as follows:

1. Establish a tare measurement with no weight on the platform.
2. Place a known calibration weight on the center of the platform such that the output of all transducers is roughly equal and then calculate the factor "sfsum" as follows:

$$sfsum = weight/sum$$

3. Place the calibration weight on the platform such that transducer A receives most of the load and record the transducer measurements as: a1, b1, c1, d1 being the respective weight measurements from the four transducers; said weight measurements being the transducer measurements with tare and reference measurements subtracted as in equation (3).
4. Place the calibration weight on the platform such that transducer B receives most of the load and record the respective weight measurements: a2, b2, c2, d2.
5. Place the calibration weight on the platform such that transducer c receives most of the load and record the respective weight measurements: a3, b3, c3, d3.
6. Place the calibration weight on the platform such that transducer d receives most of the load and record the respective weight measurements: a4, b4, c4, d4.
7. Initialize the correction factors, sfa,sfb,sfc,sfd to zero and calculate new values for these coefficients in the following iterative loop until all correction factors reach their asymptotic value:

Loop begin $$(6a)\ sfa = (weight - sum*sfsum - b1*sfb - c1*sfc - d1*sfd)/a1$$

$$(6b)\ sfb = (weight - sum*sfsum - a2*sfa - c2*sfc - d2*sfd)/b2$$

$$(6c)\ sfc = (weight - sum*sfsum - a3*sfa - b3*sfb - d3*sfd)/c3$$

$$(6d)\ sfd = (weight - sum*sfsum - a4*sfa - b4*sfb - c4*sfc)/d4$$

Loop end

At this point, it is possible to go directly to step 9 and store the coefficients: sfsum, sfa, sfb, sfc, sfd; however, because of the five degrees of freedom, it is also possible to adjust the solution to provide certain other benefits. Some computer implementations may be simplified by adjusting the coefficients such that all of them are positive. Further simplification may be effected by adjusting the coefficients so that one of them is equal to zero thus eliminating that term in the calculation.

8. To adjust the coefficients so that the minimum value is zero:
   a) select the coefficient with the minimum value,
   b) compute a new value of sfsum as follows (if, for example, sfa is the minimum coefficient) sfsum=(a*sfa)/sum, and
   c) use this value of sfsum in the loop of step 7 and repeat the loop of step 7 and the process of step 8 until the result reaches its asymptotic value.
9. Store the coefficients in non-volatile memory in the scale to be used in the calculation of weight during normal operation.

This method may be extended to include nonlinearity corrections by including terms that model nonlinearity effects such as high order power functions, exponentials, or polynomials. Using a second order nonlinearity model, equation 2 is modified as follows:

$$(7)\ weight = sum*sfsum + a*sfa + b*sfb + c*sfc + d*sfd + a**2*sfa2 + b**2*sfb2 + c**2*sfc2 + d**2*sfd2,$$

where the terms for this equation are as defined for equation (2) with the addition of:

sfa2, sfb2, sfc2, sfd2 which are the coefficients for the associated second order terms.

The calibration factors in equation (6a) are modified as follows:

$$(8)\ sfa = (weight - (sum*sfsum + b1*sfb + c1*sfc + d1*sfd + a**2*sfa2 + b**2*sfb2 + c**2*sfc2 + d**2*sfd2))/a1$$

where the terms are as defined above for equation (7). Equations (6b), (6c), and (6d) are modified in an analogous manner.

The nonlinearity terms (sfa2, etc.) are typically of small enough magnitude that they may be determined once for a given design and need not be evaluated for each scale at manufacturing time. The scale factor terms (sfa, etc.) typically require evaluation for each scale.

The Tare Function

The tare function is used to set the zero weight load. The constants determined by the tare function are used in equations (2)–(5). When the tare function is performed, the current weight on the platform is set to zero by subtracting an offset from the reading. This tare offset is subtracted from all subsequent readings. This operation corrects for amplifier offsets, gage offsets, platform weight, and optionally, any container or other weight that is placed on the platform when the tare function is performed. The tare function is performed initially as part of the power up sequence. After power up, it will be performed any time the "TARE" button is pressed.

Automatic Zero Mode

The preferred embodiment offers an optional mode of operation that tracks system offsets to provide a continuously updating automatic zeroing of the display. When the operator selects this mode, any measurement with an absolute value of less than a preset threshold weight (e.g. 2 lb), causes a gradual increment of the tare offset, which is subtracted from all measurements, such that the display gradually decrements toward zero. This mode maintains a zero display for long periods without requiring the operator to command a new TARE operation. When an object whose weight is greater than the threshold weight is placed on the scale, no changes are applied to the tare offset, resulting in a stable display for the duration of the weighing operation.

While the invention has been described in connection with what is presently considered to be the most practical and preferred embodiment, it is to be understood that the invention is not to be limited to the disclosed embodiment, but to the contrary, is intended to cover various modifications and equivalent arrangements included within the spirit and scope of the appended claims.

What is claimed is:

1. A weighing apparatus for measuring a load weight, the apparatus comprising:

a plurality of load sensing transducers each producing an output;

a switching means connected to receive the sensing transducer outputs for selecting a predetermined sequence of the transducer outputs;

converting means following the switching means for converting the output sequence to a digital representation;

processing means coupled to the converting means for processing the digital representation to derive a weight measurement result; and means for providing a reference signal to the processing means, wherein the processing means includes means for utilizing the digital representation of the output sequence together with a system error model to derive a corrected weight measurement result thereby for reducing errors in the derived weight result.

2. An apparatus as claimed in claim 1 further including a drive signal network for applying a drive signal to the plurality of load transducers, and wherein the reference signal providing means includes a resistor network connected to the drive signal network.

3. An apparatus as claimed in claim 2 wherein the resistor network includes a variable resistor, scale factor equalization being accomplished, at least in part, by varying the resistance of the variable resistor.

4. An apparatus as claimed in claim 1 further including an amplifier means coupled to the switching means for amplifying the selected output sequence.

5. An apparatus as claimed in claim 4 wherein the switching means performs signal selection before amplification by the amplifier means.

6. An apparatus as claimed in claim 4 wherein the amplifier means includes an amplifier with a high input impedance.

7. An apparatus as claimed in claim 6 wherein the amplifier means includes an operational amplifier configured in a positive gain configuration to achieve a high input impedance.

8. An apparatus as claimed in claim 4 wherein the amplifier means includes means for setting the gain.

9. An apparatus as claimed in claim 1 further including a means for providing an electrical sum signal representing an approximate sum of the plural load sensing transducer outputs, and wherein the processing means uses the approximate sum signal together with individual transducer signal measurements to derive the weight measurement result.

10. An apparatus as claimed in claim 9 further including a drive signal network for applying a drive signal to the load transducers, and wherein the electrical sum signal providing means includes a resistor network connected to the drive signal network.

11. An apparatus as claimed in claim 9 wherein the switching means switches the electrical sum signal measurement more frequently than an individual transducer measurement during the course of a complete cycle of the measurement sequence.

12. An apparatus as claimed in claim 1 further including a temperature measurement sensor producing a temperature signal representing the temperature of the weight sensing transducers and wherein the processing means is coupled to the temperature signal and uses the temperature signal to reduce errors in the derived weight measurement result.

13. An apparatus as claimed in claim 1 wherein the switching means switches the reference signal measurement at least once in association with a transducer output measurement, and the processing means utilizes the reference measurement and the associated signal measurement as part of the weight measurement result.

14. An apparatus as claimed in claim 9 wherein the measurement sequence provides for at least one reference signal measurement before and after an electrical sum signal measurement, and the processing means utilizes both reference measurements together with the associated signal measurement as part of the weight measurement result.

15. An apparatus as claimed in claim 1 wherein the error model includes at least one factor for span.

16. An apparatus as claimed in claim 1 wherein the error model includes at least one factor for span nonlinearity.

17. An apparatus as claimed in claim 1 wherein the error model includes at least one factor for creep.

18. An apparatus as claimed in claim 1 wherein the error model includes at least one factor for system offset.

19. A weighing apparatus comprising:

a plurality of load sensing transducers that, in use, are coupled to a load, the plurality of load sensing transducers each generating an output signal, the output signals of the transducers having a known relationship to the load weight;

a reference circuit providing a reference signal;

a switch electrically coupled to the plurality of load sensing transducer output signals and the reference signal, the switch selecting among the transducer output signals and the reference signal according to a prescribed sequence and producing a corresponding switched output;

a converter coupled to the switch output, the converter converting the switch output to digital representation; and a processor connected to receive the digital representation, the processor processing the digital representation to derive a weight measurement result and using the reference signal to reduce errors in the derived weight result.

20. A weighing apparatus as claimed in claim 19 further including a drive signal network for applying a drive signal to the plurality of load transducers, and wherein the reference signal is derived from a resistor network connected to the drive signal network.

21. An apparatus as claimed in claim 19 further including an electrical sum signal representing an approximate sum of the plural load sensing transducer outputs, and the processor uses the approximate sum signal together with individual transducer signal measurements to derive the weight measurement result.

22. An apparatus as claimed in claim 21 further including a drive signal network for applying a drive signal to the load transducers, and wherein the electrical sum signal is derived from a resistor network connected to the drive signal network.

* * * * *